US005958864A

United States Patent [19]

Artiga Gonzalez et al.

[11] Patent Number: 5,958,864

[45] Date of Patent: Sep. 28, 1999

[54] METHOD FOR PREPARING AN AMORPHOUS ALKALI SILICATE WITH IMPREGNATION

[75] Inventors: Rene-Andres Artiga Gonzalez; Hubert Freese, both of Duesseldorf, Germany; Manfred Greger, Schifflange, Luxembourg; Kathrin Schnepp; Adolf Wiche, both of Duesseldorf, Germany

[73] Assignee: Henkel Kommandiggesellschaft auf Aktien, Duesseldorf, Germany

[21] Appl. No.: 09/043,222

[22] PCT Filed: Sep. 5, 1996

[86] PCT No.: PCT/EP96/03905

§ 371 Date: Jun. 24, 1998

§ 102(e) Date: Jun. 24, 1998

[87] PCT Pub. No.: WO97/10325

PCT Pub. Date: Mar. 20, 1997

[30] Foreign Application Priority Data

Sep. 13, 1995 [DE] Germany .......................... 195 33 790

[51] Int. Cl.$^6$ .............................. C11D 3/08; C11D 7/14; C01B 33/32

[52] U.S. Cl. .......................... 510/443; 510/441; 510/442; 510/452; 510/509; 510/511; 423/326; 423/332

[58] Field of Search .................................... 510/443, 441, 510/442, 452, 511, 509; 423/326, 332

[56] References Cited

U.S. PATENT DOCUMENTS

| | | | |
|---|---|---|---|
| 1,985,424 | 12/1934 | Piggott | 260/124 |
| 2,016,962 | 10/1935 | Flint et al. | 260/127 |
| 2,703,798 | 3/1955 | Schwartz | 260/211 |
| 3,234,258 | 2/1966 | Morris | 260/460 |
| 3,838,193 | 9/1974 | Kajitani et al. | 423/351 |
| 3,839,226 | 10/1974 | Yates | 502/407 |
| 3,849,327 | 11/1974 | DiSalvo et al. | 252/109 |
| 3,879,527 | 4/1975 | Bertorelli et al. | 423/332 |
| 3,912,649 | 10/1975 | Bertorelli et al. | 252/135 |
| 3,920,586 | 11/1975 | Bonaparte et al. | 252/531 |
| 3,929,679 | 12/1975 | Cala | 510/349 |
| 3,932,140 | 1/1976 | Jayawant et al. | 23/293 A |
| 3,956,467 | 5/1976 | Bertorelli | 423/332 |
| 3,959,445 | 5/1976 | Jayawant et al. | 423/332 |
| 4,022,704 | 5/1977 | Balfanz et al. | 510/531 |
| 4,203,851 | 5/1980 | Ramachandran | 510/101 |
| 4,370,250 | 1/1983 | Joshi | 510/320 |
| 4,414,129 | 11/1983 | Joshi | 510/534 |
| 4,664,839 | 5/1987 | Rieck | 252/175 |
| 4,820,439 | 4/1989 | Rieck | 252/135 |
| 5,075,041 | 12/1991 | Lutz | 252/548 |
| 5,188,786 | 2/1993 | Wilms | 264/117 |
| 5,318,733 | 6/1994 | Carduck et al. | 264/15 |
| 5,382,377 | 1/1995 | Raehse et al. | 252/174 |
| 5,494,488 | 2/1996 | Arnoldi et al. | 8/137 |
| 5,501,810 | 3/1996 | Eugster et al. | 510/442 |
| 5,580,941 | 12/1996 | Krause et al. | 527/300 |

FOREIGN PATENT DOCUMENTS

| | | |
|---|---|---|
| 94 58592 | 8/1994 | Australia . |
| 0 164 514 | 12/1985 | European Pat. Off. . |
| 0 488 868 | 6/1992 | European Pat. Off. . |
| 0 525 239 | 2/1993 | European Pat. Off. . |
| 0 526 978 | 2/1993 | European Pat. Off. . |
| 0 542 131 | 5/1993 | European Pat. Off. . |
| 0 561 656 | 9/1993 | European Pat. Off. . |
| 0 582 478 | 2/1994 | European Pat. Off. . |
| 42 03 031 | 8/1993 | Germany . |
| 42 21 381 | 2/1994 | Germany . |
| 43 00 772 | 7/1994 | Germany . |
| 43 03 320 | 8/1994 | Germany . |
| 44 17 734 | 11/1995 | Germany . |
| 44 19 745 | 12/1995 | Germany . |
| 44 46 363 | 6/1996 | Germany . |
| 195 01 269 | 7/1996 | Germany . |
| 58/217 598 | 12/1983 | Japan . |
| 90/13533 | 11/1990 | WIPO . |
| 91/02047 | 2/1991 | WIPO . |
| 92/06984 | 4/1992 | WIPO . |
| 93/02176 | 2/1993 | WIPO . |

OTHER PUBLICATIONS

Ullmanns Enzyclopaedie der Technischen Chemie, 4th Ed., vol. 21, p. 412 (1982).

*Primary Examiner*—Lorna M. Douyon
*Attorney, Agent, or Firm*—Ernest G. Szoke; Wayne C. Jaeschke; Real J. Grandmaison

[57] ABSTRACT

A process for producing a particulate amorphous alkali metal silicate having a molar ratio of $M_2O$ to $SiO_2$ of 1:1.5 to 1:3.3 by a) spray-drying an aqueous mixture of amorphous alkali metal silicate, b) impregnating the spray-dried amorphous alkali metal silicate with an aqueous dispersion or solution of detergent composition components containing at least one organic component, and c) optionally drying the impregnated amorphous alkali metal silicate.

18 Claims, No Drawings

METHOD FOR PREPARING AN AMORPHOUS ALKALI SILICATE WITH IMPREGNATION

BACKGROUND OF THE INVENTION

1. Field of the Invention

This invention relates to a process for the production of free-flowing amorphous alkali metal silicates by spray drying, the alkali metal silicate subsequently being impregnated with ingredients of detergents or cleaners, and to the use of the alkali metal silicates thus impregnated in detergents or cleaners.

2. Discussion of Related Art

It is known that hydrated water-soluble particulate silicates still containing about 20% by weight of water can be obtained by spray drying or roller drying of waterglass solutions (cf. Ullmanns Enzyclopädie der technischen Chemie, 4th Edition, 1982, Vol 21, page 412). Such products are commercially available for various purposes. Corresponding powders have a very loose structure as a result of spray drying. Their bulk densities are generally well below 700 g/l, for example 300 g/l or even lower.

Granular alkali metal silicates with relatively high bulk densities can be obtained in accordance with the teaching of European patent application EP-A-0 526 978, in which an alkali metal silicate solution with a solids content of 30 to 53% by weight is introduced into a heated drum in which a shaft comprising a number of arms extending close to the inner wall of the drum rotates about the longitudinal axis, the drum wall having a temperature of 150 to 200° C. and the drying process being supported by a gas introduced into the drum with a temperature of 175 to about 250° C. This process gives a product with an average particle size of 0.2 to 2 mm. A preferred drying gas is heated air.

European patent application EP-A-0 542 131 describes a process in which a product with a bulk density of 500 to 1,200 g/l completely dissolved in water at room temperature is obtained. Heated air is preferably used as the drying gas. This process also uses a cylindrical dryer with a heated wall (160 to 200° C.) in which a rotor with vane-like blades rotates longitudinally at such a speed that a pseudoplastic paste with a free water content of 5 to 12% by weight is formed from the silicate solution with a solids content of 40 to 60% by weight. The drying process is supported by a hot air stream (220 to 260° C.).

Earlier, hitherto unpublished German patent application P 44 19 745.4 also describes a water-soluble, amorphous and granular alkali metal silicate which is produced by a process similar to that described in EP-A-0 526 978, but which does contain silica. The term "amorphous" means "X-ray-amorphous". This means that, in X-ray diffraction patterns, the alkali metal silicates do not produce any sharp reflexes, but at best one or more broad maxima of which the width amounts to several degrees of the diffraction angle. However, this does not mean that regions producing sharp electron diffraction reflexes will not be found in electron diffraction experiments. This may be interpreted to mean that the substance contains microcrystalline regions up to about 20 nm (max. 50 nm) in size.

Granular amorphous sodium silicates obtained by the spray drying of aqueous waterglass solutions, subsequent grinding, compaction and spheronizing with additional drying of the ground material are the subject of U.S. Pat. Nos. 3,912,649, 3,956,467, 3,838,193 and 3,879,527. The products obtained in this way have a water content of about 18 to 20% by weight for bulk densities well below 500 g/l.

Other granular alkali metal silicates with multiple wash cycle performance are known from European patent applications EP-A-0 561 656 and EP-A-0 488 868. The products in question are compounds of alkali metal silicates with certain Q distributions and alkali metal carbonates.

Earlier hitherto unpublished German patent application P 44 46 363.4 describes an amorphous alkali metal silicate with multiple wash cycle performance and a molar $Na_2O:SiO_2$ ratio of 1:1.5 to 1:3.3 which is impregnated with ingredients of detergents or cleaners and which has a bulk density of 300 g/l. The silicate carrier particles to be impregnated are preferably present in granular form and/or in the form of a compound with alkali metal carbonates and may be produced by spray drying, granulation and/or compacting, for example roller compacting. In one preferred embodiment, the silicate is impregnated with surfactants, more particularly with nonionic surfactants. By taking up the impregnating agent, the silicate material loses some of its free-flow properties although they can be restored by subsequently treating the impregnated material with an aqueous solution.

However, it has been found that spray-dried amorphous alkali metal silicates free from additional alkali metal carbonates show inadequate flow properties after impregnation and subsequent coating with an aqueous solution.

DESCRIPTION OF THE INVENTION

Accordingly, the problem addressed by the present invention was to develop a process which would give spray-dried amorphous silicates that could be impregnated without any serious loss of flowability, even in the absence of additionally used alkali metal carbonates in the mixture to be spray-dried.

In a first embodiment, therefore, the present invention relates to a process for the production of a particulate amorphous alkali metal silicate with a molar $M_2O:SiO_2$ ratio (M=alkali metal) of 1:1.5 to 1:3.3, in which a) an aqueous mixture essentially containing an amorphous alkali metal silicate with the composition indicated above as active substances is spray-dried and b) is subsequently impregnated with an aqueous dispersion of ingredients of detergents or cleaners, at least one organic ingredient of detergents or cleaners being present in the form of a dispersion in water or an aqueous solution, and c) is optionally dried.

Preferred amorphous alkali metal silicates have a molar $M_2O:SiO_2$ ratio (M=alkali metal) of 1:1.9 to 1:3 and, more particularly, up to 1:2.8. Sodium and/or potassium silicate are particularly suitable, sodium silicates being preferred for economic reasons. However, if for applicational reasons importance is attributed to a particularly high dissolving rate in water, it is advisable at least partly to replace the sodium by potassium. For example, the composition of the alkali metal silicate may be selected so that the silicate has a potassium content, expressed as $K_2O$, of up to 5% by weight. It is specifically pointed out that all amorphous alkali metal silicates with the modulus indicated above, including commercially available granular silicates or carbonate/silicate compounds besides the known waterglasses, are suitable starting materials in the context of the present invention. These silicates may themselves have been produced by spray drying, granulation and/or compacting, for example by roller compacting, although such methods of producing the silicate-containing starting products are not always appropriate because these products are going to be re-dissolved in an aqueous mixture.

The aqueous mixture to be spray-dried essentially contains the alkali metal silicates mentioned as active substance. One particularly preferred embodiment is characterized by the preparation of a slurry which does not contain any alkali metal carbonates or only contains alkali metal carbonates in ratios by weight of alkali metal silicate (based on water-free active substance) to alkali metal carbonate of 3:1 to 20:1. Another preferred embodiment of the invention is characterized by the production of spray-dried silicate compounds (a) which contain 55 to 95% by weight and preferably 60 to 90% by weight of alkali metal silicate (based on water-free active substance), 0 to 15% by weight and preferably 2 to 10% by weight of alkali metal carbonate and 5 to 22% by weight, preferably 10 to 20% by weight and more preferably at least 15% by weight of water.

However, other ingredients, more particularly ingredients of detergents or cleaners, may be incorporated in the mixture to be spray-dried. Based on the spray-dried silicate product of process step (a), the content of these other ingredients is preferably 0.5 to 20% by weight and more preferably 1 to 15% by weight. The other ingredients in question may be, for example, surfactants, above all anionic surfactants, such as alkyl benzene sulfonates, alkyl sulfates, 2,3-alkyl sulfates, alkyl ether sulfates and soaps, and also neutral salts, such as sodium or potassium sulfates, redeposition inhibitors or nonionic surfactants, such as alkyl polyglycosides or optionally alkoxylated polyhydroxyfatty acid esters. In one preferred embodiment of the invention, anionic surfactants and/or organic co-builders (as described hereinafter) are used in the slurry to be spray-dried, preferably in quantities of 1 to 15% by weight, based on the spray-dried silicate product of process step (a).

In contrast to granular products of equivalent composition, spray-dried products are normally distinguished by a relatively low absorption capacity for ingredients of detergents or cleaners which are liquid to wax-like at the usual processing temperatures; this is attributable to the sintered surface of the spray-dried beads. To enable ingredients such as these to be applied to the spray-dried beads, their surface structure first has to be destroyed or their surface correspondingly enlarged. The spray-dried silicate products (a) are preferably impregnated with quantities of 3 to 40% by weight and, more particularly, 5 to 35% by weight, based on the impregnated and optionally dried silicate product, of an aqueous dispersion of ingredients of detergents or cleaners. Suitable impregnating agents are, for example, surfactants, silicone- and/or paraffin-based foam inhibitors or fabric-softening compounds, such as cationic surfactants. Surfactants and foam inhibitors are particularly preferred. Particularly preferred impregnating agents are nonionic surfactants, for example alkoxylated, preferably ethoxylated and/or ethoxylated and propoxylated, aliphatic $C_{8-22}$ alcohols. These include in particular primary alcohols preferably containing 8 to 18 carbon atoms and, on average, 1 to 12 moles of ethylene oxide (EO) per mole of alcohol, in which the alcohol radical may be linear or, preferably, 2-methyl-branched or may contain linear and methyl-branched radicals in the form of the combinations normally present in oxoalcohol radicals. However, alcohol ethoxylates with linear radicals of alcohols of native origin containing 12 to 18 carbon atoms, for example of coconut oil fatty alcohol, palm oil fatty alcohol, tallow fatty alcohol or oleyl alcohol, and on average 2 to 8 EO per mole of alcohol are also preferred. Preferred ethoxylated alcohols include, for example, $C_{12-14}$ alcohols containing 3 EO or 4 EO, $C_{9-11}$ alcohol containing 7 EO, $C_{13-15}$ alcohols containing 3 EO, 5 EO, 7 EO or 8 EO, $C_{12-18}$ alcohols containing 3 EO, 5 EO or 7 EO and mixtures thereof, such as mixtures of $C_{12-14}$ alcohol containing 3 EO and $C_{12-18}$ alcohol containing 5 EO. The degrees of ethoxylation mentioned represent statistical mean values which, for a special product, may be either a whole number or a broken number. Preferred alcohol ethoxylates have a narrow homolog distribution (narrow range ethoxylates, NRE). In addition to these nonionic surfactants, fatty alcohols containing more than 12 EO may also be used. Examples of such fatty alcohols are tallow fatty alcohol containing 14 EO, 25 EO, 30 EO or 40 EO. Another class of preferred nonionic surfactants which are used either as sole nonionic surfactant or in combination with other nonionic surfactants, particularly together with alkoxylated fatty alcohols, are alkoxylated, preferably ethoxylated or ethoxylated and propoxylated, fatty acid alkyl esters preferably containing 1 to 4 carbon atoms in the alkyl chain, more particularly the fatty acid methyl esters which are described, for example, in Japanese patent application JP 58/217598 or which are preferably produced by the process described in International patent application WO-A-90/13533.

In addition, alkyl glycosides corresponding to the general formula $RO(G)_x$ may be used as further nonionic surfactants. In this general formula, R is a primary, linear or methyl-branched, more particularly 2-methyl-branched, aliphatic radical containing 8 to 22 and preferably 12 to 18 carbon atoms and G is a glycose unit containing 5 or 6 carbon atoms, preferably glucose. The degree of oligomerization x, which indicates the distribution of monoglycosides and oligoglycosides, is a number of 1 to 10.

The nonionic surfactants mentioned may be used on their own or in combination with the other nonionic surfactants mentioned or even in combination with other water-insoluble organic components, in which case the alkoxylated, preferably ethoxylated or ethoxylated and propoxylated, fatty acid alkyl esters mentioned may advantageously be used in addition to the alkoxylated fatty alcohols as an organic dispersion component.

If foam inhibitors are used for impregnation, the silicate products preferably contain 70 to 90% by weight of amorphous silicates, 0.1 to 2% by weight of silicone- and/or paraffin-based foam-inhibiting oils and/or waxes and, for the rest, water. These silicate products may optionally contain other ingredients, for example anionic surfactants, more particularly alkyl benzene-sulfonates and/or alkyl sulfates, and/or co-builders, more particularly (polymeric) polycarboxylates, and/or phosphonates. The content of these other ingredients is preferably below 20% by weight, more preferably below 15% by weight and most preferably below 10% by weight.

It has surprisingly been found that spray-dried silicate-containing products impregnated with organic ingredients of detergents or cleaners only show adequate flow properties when the impregnating agent is applied in the form of an aqueous dispersion and, more particularly, in the form of an emulsion. One preferred embodiment of the invention is characterized by the use of an emulsion of one or more nonionic surfactants and water or an aqueous solution of one or more inorganic salts. In many cases, a dispersion of nonionic surfactants in water is not sufficient in itself to obtain products with satisfactory flow properties. Dispersions containing aqueous solutions of inorganic salts are used in particular where alkoxylated alcohols, more particularly fatty alcohols, are used as the impregnating medium. It is assumed that the use of the aqueous salt solution increases the viscosity of the dispersion accordingly so that the end product has improved flow properties.

In all cases where the dispersion does not have to be thickened with inorganic salts, dispersions of nonionic surfactant and water are also sufficient. In cases such as these, the expert is able by a simple test (free-flowing test) to determine whether he should use an aqueous salt solution in the dispersion or whether water is sufficient as the sole inorganic component of the dispersion. Accordingly, a preferred embodiment is characterized by the use of a dispersion which contains ethoxylated or ethoxylated and propoxylated fatty acid alkyl esters of the type mentioned as an organic ingredient and only water, but not a salt solution, as an inorganic component.

However, salt solutions, more particularly solutions of silicates, carbonates, bicarbonates and/or sulfates, are preferably used in the aqueous dispersion. Silicates and (bi) carbonates are particularly preferred; sulfates are used in only relatively small amounts.

Thus, the sulfate content, based on the dispersion as a whole, is preferably only 2 to 10% by weight while the silicate and/or (bi)carbonate content of the dispersion may be as high as 40% by weight or even 50% by weight. Another preferred embodiment of the invention is characterized by the use of a silicate product which either has served as starting material for step (a) of the process or was obtained as a spray-dried product in step (a) of the process. In one particularly advantageous embodiment, a solution of the spray-dried product (a) in water is used in the aqueous dispersion, preferably in quantities of 10 to 40% by weight and more preferably in quantities of 15 to 35% by weight, based on the dispersion as a whole.

The water content of the dispersions is preferably in the range from 10 to 40% by weight and more preferably in the range from 15 to 35% by weight.

Preferred dispersions preferably contain at least 40% by weight and, more preferably, 50 to 85% by weight of dispersed organic ingredients of detergents or cleaners.

The quantity of water used can be a critical factor relative to the free-flowing behavior of the finished product depending on the impregnating agent used and on the water content of the spray-dried silicate-containing product (a). Accordingly, water is preferably used in quantities of not more than 20% by weight (based on the impregnated but not subsequently dried product) in the impregnation process.

The water content of the silicate-containing end products is preferably not more than 22% by weight and, in particular, not more than 20% by weight. If, therefore, a water content above the limits mentioned is reached in the product through the water content of the spray-dried product and the aftertreatment, the first two steps of the process are followed by a concluding drying step in another preferred embodiment of the invention, this drying step advantageously being integrated into a continuous process.

The impregnation step (b) of the process may be carried out, for example, by initially preparing an aqueous dispersion and, preferably, an aqueous dispersion of nonionic surfactant and water or aqueous inorganic salt solution by intensive mixing of the nonionic surfactant and water or the aqueous solution of the nonionic surfactant, the inorganic solid salt and water. The actual impregnating treatment may be conventionally carried out in typical mixers/granulators of the high-speed mixer type, for example in a Lödige Recycler CB30® (Lödige, Federal Republic of Germany), in a Schugi Flexomix® (Schugi, Federal Republic of Germany) or in a Fukae GS30 mixer and also in slower mixers, for example in Lödige plowshare mixers.

In one particularly preferred embodiment of the invention, not only the silicate-containing product (a) is subjected to process step (b). On the contrary, a spray-dried silicate-containing product (a) and at least one other solid powder-form or granular product, which is a single raw material or a compound of at least two different raw materials, are impregnated together in step (b) of the process. It has proved to be of particular advantage in this regard to use an alkali-carbonate-containing compound, which also contains organic co-builders of the type described above, as the additional compound. In a preferred embodiment, 60 to 80 parts by weight of the spray-dried silicate-containing product (a) and 5 to 20 parts by weight of at least one other solid powder-form or granular product are impregnated together in process step (b).

Another embodiment of the invention is characterized in that the product obtained in step (b) of the process is aftertreated with another liquid preparation before being dried in an optional concluding step. In this case, 60 to 85 parts by weight of a spray-dried silicate product (a) are preferably first impregnated with 5 to 38 parts by weight of an aqueous dispersion (b) and then aftertreated with 2 to 15 parts by weight of another liquid preparation, preferably an aqueous solution of organic co-builders. Organic co-builder solutions such as these preferably contain at least 20% by weight of solids and preferably 25 to 50% by weight of solids in order not excessively to increase the water content in the silicate product. In this case, too, the maximum water content should preferably not exceed 22% by weight and, in particular, should be no more than 20% by weight in the absence of a concluding drying step. Accordingly, a procedure such as this is particularly appropriate when either a dispersion containing large quantities, for example more than 50% by weight, of organic dispersed ingredient and/or small amounts, for example less than 20% by weight, of water is used in step (b) of the process or when only relatively small quantities of the aqueous dispersion, for example less than 25% by weight and, more particularly, distinctly less than 20% by weight, based on the product ultimately obtained but not dried, are used.

If desired or in consequence of the relatively large quantities of water used during impregnation with the aqueous dispersion or during impregnation with an aqueous dispersion and another aftertreatment, a drying step is carried out, preferably in a fluidized bed. This drying step is preferably carried out immediately after the process steps described above, i.e. without preliminary storage of the silicate product. Drying is preferably carried out when the water content after the first two steps of the process and the optional aftertreatment (expressed as the total water content of the spray-dried silicate, the aqueous dispersion and optionally the aqueous preparation from the aftertreatment) is above 22% by weight and preferably above 20% by weight.

The bulk density of the silicate-containing products produced in accordance with the invention is generally between 300 and 650 g/l and can be further increased by known compacting measures, for example by roller compacting or by extrusion. The particle size distribution (sieve analysis) is generally so pronounced that no dust particles (particles smaller than 0.1 mm in diameter) are obtained and preferably 60 to 100% by weight and, more preferably, 80 to 100% by weight of the particles have a particle diameter of at least 0.2 mm and at most 1.6 mm.

If desired, the silicate-containing products obtained after step (b), another aftertreatment or step (c) of the process according to the invention may be aftertreated with fine-particle dry powders in order further to increase their bulk density. In one particular embodiment, the dry powder is used in a quantity of 1 to 5 parts by weight per 100 parts by weight of the silicate-containing product. Examples of such dry powders are zeolite, silicas, salts of fatty acids, such as calcium stearate, and bleach activators and fine-particle alkyl sulfates or mixtures of zeolite or silica with at least one other of the powders mentioned.

The amorphous and impregnated alkali metal silicates produced in accordance with the invention may be used as additives in powder-form to granular detergents or cleaners or as a constituent in the production of granular cleaners or detergents, preferably during the granulation and/or compacting phase. Detergents or cleaners such as these may have a bulk density of 300 to 1,200 g/l and preferably 500 to 1,000 g/l and contain the impregnated silicates produced in accordance with the invention in quantities of preferably 5 to 50% by weight and, more preferably, 10 to 40% by weight. They may be produced by any of the known processes, such as mixing, spray drying, granulation, compacting, such as roller compacting, and extrusion. Particularly suitable processes are those in which several components, for example spray-dried components and granulated and/or extruded components, are mixed together. Other spray-dried or granulated components may be subsequently impregnated during working up, for example with nonionic surfactants, more particularly ethoxylated fatty alcohols, by conventional methods. In granulation and extrusion processes in particular, any anionic surfactants present may advantageously be used in the form of a spray-dried, granulated or extruded compound either as a mixing component in the process or as an additive after other granules. It is also possible and, depending on the formulation, can be of advantage subsequently to add other individual components of the detergent or cleaner, for example carbonates, citrate or citric acid or other polycarboxylates or polycarboxylic acids, polymeric polycarboxylates, zeolite and/or layer silicates, for example layer-form crystalline disilicates, to spray-dried granulated and/or extruded components optionally impregnated with nonionic surfactants and/or other ingredients that are liquid to wax-like at the processing temperature. A preferred process in this regard is one in which the surface of individual components of the detergent or the surface of the detergent as a whole is subsequently treated to reduce the tackiness of the granules rich in nonionic surfactants and/or to improve their solubility. Suitable surface modifiers are known from the prior art. Besides other suitable surface modifiers, fine-particle zeolites, silicas, amorphous silicates, fatty acids or fatty acid salts, for example calcium stearate, but especially mixtures of zeolite and silica, more particularly in a ratio by weight of zeolite to silica of at least 1:1, or zeolite and calcium stearate are particularly preferred.

Particularly preferred embodiments of the invention are extruded detergents or cleaners with a bulk density above 600 g/l which contain anionic and optionally nonionic surfactants and an amorphous and impregnated alkali metal silicate of the type produced in accordance with the invention in the extrudate. As in other production processes, the particulate alkali metal silicates produced in accordance with the invention may serve as a mixing component although, in a particularly preferred embodiment, the alkali metal silicates are incorporated in the compound to be extruded and are co-extruded.

These extruded detergents or cleaners may be produced by known extrusion processes, cf. in particular European patent 486 592. In this process, a solid free-flowing compound is extruded under pressures of up to 200 bar to form a strand, the strand is cut into granules of a certain size by means of a cutting unit as it leaves the extrusion dye and the plastic and optionally still moist crude extrudate is subjected to another shaping processing step and subsequently dried, the impregnated alkali metal silicates produced in accordance with the invention being used in the compound.

In addition to the impregnated alkali metal silicates produced in accordance with the invention, the final detergents or cleaners may contain the following ingredients. The following list also contains fairly detailed descriptions of some of the ingredients occurring in the silicate additives produced in accordance with the invention.

These ingredients include in particular surfactants, above all anionic surfactants and optionally nonionic surfactants, but also cationic, amphoteric or zwitterionic surfactants.

Suitable surfactants of the sulfonate type are preferably $C_{9-13}$ alkyl benzene sulfonates, olefin sulfonates, i.e. mixtures of alkene and hydroxy-alkane sulfonates, and the disulfonates obtained, for example, from $C_{12-18}$ monoolefins with an internal or terminal double bond by sulfonation with gaseous sulfur trioxide and subsequent alkaline or acidic hydrolysis of the sulfonation products. Other suitable surfactants of the sulfonate type are alkane sulfonates obtained from $C_{12-18}$ alkanes, for example by sulfochlorination or sulfoxidation and subsequent hydrolysis or neutralization. The esters of $\alpha$-sulfofatty acids (ester sulfonates), for example the $\alpha$-sulfonated methyl esters of hydrogenated coconut oil, palm kernel oil or tallow fatty acids, are also suitable. Other suitable anionic surfactants are the $\alpha$-sulfofatty acids obtainable by ester cleavage of the $\alpha$-sulfofatty acid alkyl esters and disalts thereof. Even in their production on an industrial scale, the monosalts of the $\alpha$-sulfofatty acid alkyl esters are obtained in the form of aqueous mixtures with limited quantities of disalts. The disalt content of such surfactants is normally below 50% by weight, for example up to about 30% by weight, based on the anionic surfactant mixture.

Other suitable anionic surfactants are sulfonated fatty acid glycerol esters which represent the monoesters, diesters and triesters and mixtures thereof which are obtained where production is carried out by esterification of a monoglycerol with 1 to 3 moles of fatty acid or in the transesterification of triglycerides with 0.3 to 2 moles of glycerol.

Suitable surfactants of the sulfate type are the sulfuric acid monoesters of primary alcohols of natural and synthetic origin. Preferred alk(en)yl sulfates are the alkali metal salts and, in particular, the sodium salts of the sulfuric acid semiesters of $C_{12-18}$ fatty alcohols, for example cocofatly alcohol, tallow fatty alcohol, lauryl, myristyl, cetyl or stearyl alcohol, or $C_{10-20}$ oxoalcohols and the corresponding semiesters of secondary alcohols with the same chain length. Other preferred alk(en)yl sulfates are those with the chain length mentioned which contain a synthetic, linear alkyl chain based on a petrochemical and which are similar in their degradation behavior to the corresponding compounds based on oleochemical raw materials. $C_{16-18}$ alk(en)yl sulfates are particularly preferred from the point of view of washing technology. It can also be of particular advantage, especially for machine detergents, to use $C_{16-18}$ alk(en)yl sulfates in combination with relatively low-melting anionic surfactants and, in particular, with anionic surfactants which have a lower Krafft point and which have a lower tendency to crystallize at relatively low washing temperatures, for example from room temperature to 40° C. In one preferred embodiment of the invention, therefore, the detergents/cleaners contain mixtures of short-chain and long-chain fatty alkyl sulfates, preferably mixtures of $C_{12-14}$ fatty alkyl sulfates or $C_{12-18}$ fatty alkyl sulfates with $C_{16-18}$ fatty alkyl sulfates and, more particularly, $C_{12-16}$ fatty alkyl sulfates with $C_{16-18}$ fatty alkyl sulfates. However, another preferred embodiment of the invention is characterized by the use of unsaturated alkenyl sulfates with an alkenyl chain length of preferably $C_{16}$ to $C_{22}$ in addition to saturated alkyl sulfates. In this embodiment, mixtures of saturated sulfonated fatty alcohols consisting predominantly of $C_{16}$ and unsaturated, sulfonated fatty alcohols consisting predominantly of $C_{18}$, for example those derived from solid or liquid fatty alcohol mixtures of the HD-Ocenol® type (a product of Henkel KGaA), are particularly preferred. Ratios by weight of alkyl sulfates to alkenyl sulfates of 10:1 to 1:2 are preferred, ratios by weight of about 5:1 to 1:1 being particularly preferred.

Other suitable anionic surfactants are 2,3-alkyl sulfates which are produced, for example, in accordance with U.S. Pat. Nos. 3,234,258 or 5,075,041 and which are marketed under the name of DAN® by the Shell Oil Company.

The sulfuric acid monoesters of linear or branched $C_{7-21}$ alcohols ethoxylated with 1 to 6 moles of ethylene oxide, such as 2-methyl-branched $C_{9-11}$ alcohols containing on average 3.5 moles of ethylene oxide (EO) or $C_{12-18}$ fatty alcohols containing 1 to 4 EO, are also suitable. In view of their high foaming capacity, they are only used in relatively small quantities, for example in quantities of 1 to 5% by weight, in detergents.

Other preferred anionic surfactants are the salts of alkyl sulfosuccinic acid which are also known as sulfosuccinates or as sulfosuccinic acid esters and which represent the monoesters and/or diesters of sulfosuccinic acid with alcohols, preferably fatty alcohols and, more particularly, ethoxylated fatty alcohols. Preferred sulfosuccinates contain $C_{8-18}$ fatty alcohol radicals or mixtures thereof. Particularly preferred sulfosuccinates contain a fatty alcohol radical derived from ethoxylated fatty alcohols which, regarded in isolation, represent nonionic surfactants (for a description, see below). Of these, sulfosuccinates of which the fatty alcohol radicals are derived from ethoxylated fatty alcohols with a narrow homolog distribution are particularly preferred. Alk(en)yl succinic acid preferably containing 8 to 18 carbon atoms in the alk(en)yl chain or salts thereof may also be used.

In addition to the anionic surfactants, the detergents or cleaners may also contain soaps, preferably in quantities of 0.2 to 5% by weight. Suitable soaps are saturated fatty acid soaps, such as the salts of lauric acid, myristic acid, palmitic acid, stearic acid, hydrogenated erucic acid and behenic acid, and soap mixtures derived in particular from natural fatty acids, for example coconut oil, palm kernel oil or tallow fatty acids.

The anionic surfactants and soaps may be present in the form of their sodium, potassium or ammonium salts and as soluble salts of organic bases, such as mono-, di- or triethanolamine. The anionic surfactants are preferably present in the form of their sodium or potassium salts and, more preferably, in the form of their sodium salts.

In one embodiment of the invention, preferred detergents or cleaners are, in particular, extruded detergents or cleaners which contain 10 to 30% by weight of anionic surfactants. Preferably at least 3% by weight and, more preferably, at least 5% by weight of these are sulfate surfactants. In one advantageous embodiment, the detergents or cleaners contain at least 15% by weight and, more particularly, 20 to 100% by weight of sulfate surfactants (based on the anionic surfactants as a whole).

Preferred nonionic surfactants are alkoxylated, advantageously ethoxylated, more particularly primary alcohols preferably containing 8 to 18 carbon atoms and an average of 1 to 12 moles of ethylene oxide (EO) per mole of alcohol, in which the alcohol radical may be linear or, preferably, 2-methyl-branched or may contain linear and methyl-branched radicals in the form of the mixtures typically present in oxoalcohol radicals. However, alcohol ethoxylates containing linear radicals of alcohols of native origin with 12 to 18 carbon atoms, for example coconut oil fatty alcohol, palm oil fatty alcohol, tallow fatty alcohol or oleyl alcohol, and an average of 2 to 8 EO per mole of alcohol are particularly preferred. Preferred ethoxylated alcohols include, for example, $C_{12-14}$ alcohols containing 3 EO or 4 EO, $C_{9-11}$ alcohol containing 7 EO, $C_{13-15}$ alcohols containing 3 EO, 5 EO, 7 EO or 8 EO, $C_{12-18}$ alcohols containing 3 EO, 5 EO or 7 EO and mixtures thereof, such as mixtures of $C_{12-14}$ alcohol containing 3 EO and $C_{12-18}$ alcohol containing 5 EO. The degrees of ethoxylation mentioned are statistical mean values which, for a special product, may be either a whole number or a broken number. Preferred alcohol ethoxylates have a narrow homolog distribution (narrow range ethoxylates, NRE). In addition to these nonionic surfactants, fatty alcohols containing more than 12 EO may also be used. Examples of such fatty alcohols are tallow fatty alcohol containing 14 EO, 25 EO, 30 EO or 40 EO.

Nonionic surfactants of the amine oxide type, for example N-ocoalkyl-N,N-dimethylamine oxide and N-tallow alkyl-N,N-dihydroxyethyl amine oxide, and the fatty acid alkanolamide type are also suitable. The quantity in which these nonionic surfactants are used is preferably no more, in particular no more than half, the quantity of ethoxylated fatty alcohols used.

Other suitable surfactants are polyhydroxyfatty acid amides corresponding to formula (I):

(I)

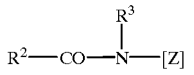

in which $R^2CO$ is an aliphatic acyl radical containing 6 to 22 carbon atoms, $R^3$ is hydrogen, an alkyl or hydroxyalkyl radical containing 1 to 4 carbon atoms and [Z] is a linear or branched polyhydroxyalkyl radical containing 3 to 10 carbon atoms and 3 to 10 hydroxyl groups.

The polyhydroxyfatty acid amides are known substances which are normally obtained by reductive amination of a reducing sugar with ammonia, an alkylamine or an alkanolamine and subsequent acylation with a fatty acid, a fatty acid alkyl ester or a fatty acid chloride. Processes for their production are disclosed in U.S. Pat. No. 1,985,424, U.S. Pat. No. 2,016,962 and U.S. Pat. No. 2,703,798 and in International patent application WO-A-92/06984. The polyhyroxyfatty acid amides are preferably derived from reducing sugars containing 5 or 6 carbon atoms, more particularly from glucose.

Nonionic surfactants are present in the detergents/cleaners according to the invention in quantities of preferably 0.5 to 15% by weight and, more preferably, 2 to 10% by weight.

Besides the amorphous and impregnated alkali metal silicates, the detergents/cleaners may contain other additional builders and co-builders. Co-builders include above all the ingredients mentioned above, for example polycarboxylates and polymeric polycarboxylates. These co-builders are present in the detergents/cleaners in quantities of preferably 2 to 20% by weight and, more preferably, 5 to 15% by weight.

However, conventional builders, such as phosphates, zeolites and crystalline layer silicates, may also be present in the detergents/builders. The synthetic zeolite used is preferably finely crystalline and contains bound water. Suitable zeolites are, for example, zeolite A. However, zeolite X and zeolite P and mixtures of A, X and/or P are also suitable. The zeolite may be used in the form of a spray-dried powder or even as an undried stabilized suspension still moist from its production. Where the zeolite is used in the form of a suspension, the suspension may contain small additions of nonionic surfactants as stabilizers, for example 1 to 3% by weight, based on zeolite, of ethoxylated $C_{12-18}$ fatty alcohols containing 2 to 5 ethylene oxide groups, $C_{12-14}$ fatty alcohols containing 4 to 5 ethylene oxide groups or ethoxylated isotridecanols. Zeolite suspensions and zeolite powders may also be used. Suitable zeolite powders have an average particle size of less than 10 $\mu$m (volume distribution as measured by the Coulter Counter Method) and contain preferably 18 to 22% by weight and, more preferably, 20 to 22% by weight of bound water.

In one preferred embodiment of the invention, detergents or cleaners contain 0 to 16% by weight of zeolite (expressed as water-free active substance) and 10 to 40% by weight of an impregnated alkali metal silicate produced in accordance with the invention. It is particularly important to ensure that the final detergent/cleaner contains at least 15% by weight of the builders mentioned.

In another preferred embodiment of the invention, therefore, the detergents/cleaners contain 0 to 5% by weight of zeolite (expressed as water-free active substance) and 15 to 40% by weight of an impregnated alkali metal silicate additive produced in accordance with the invention or 10 to 30% by weight of zeolite (expressed as water-free active substance) and 15 to 40% by weight of a silicate-containing additive produced in accordance with the invention. The zeolite need not only be co-extruded, it may also be completely or partly introduced into the detergent/cleaner in a subsequent step, i.e. after the extrusion step. Detergents or cleaners containing a granulated extrudate internally free from zeolite are particularly preferred.

Crystalline layer silicates and/or conventional phosphates may also be used as substitutes for the zeolite. However, phosphates are preferably present in the detergents/cleaners in only small quantities, more particularly in quantities of up to at most 10% by weight.

Suitable crystalline layer silicates are, in particular, crystalline layer-form sodium silicates with the general formula $NaMSi_xO_{2x+1}.yH_2O$, where M is sodium or hydrogen x is a number of 1.9 to 4 and y is a number of 0 to 20, preferred values for x being 2, 3 or 4. Crystalline layer silicates such as these are described, for example, in European patent application EP-A-0 164 514. Preferred crystalline layer silicates corresponding to the above formula are those in which M is sodium and x assumes a value of 2 or 3. Both β- and δ-sodium disilicates $Na_2Si_2O_5.yH_2O$ are particularly preferred. However, these crystalline layer silicates are only present in the extrudates according to the invention in quantities of preferably not more than 10% by weight, more preferably less than 8% by weight and advantageously at most 5% by weight.

Useful organic co-builders are, for example, polycarboxylic acids preferably used in the form of their sodium salts, such as citric acid, adipic acid, succinic acid, glutaric acid, tartaric acid, sugar acids, aminocarboxylic acids, nitrilotriacetic acid (NTA), providing their use is not ecologically objectionable, and mixtures thereof. Preferred salts are the salts of the polycarboxylic acids, such as citric acid, adipic acid, succinic acid, glutaric acid, tartaric acid, sugar acids and mixtures thereof.

However, polymeric polycarboxylates, for example the sodium salts of polyacrylic acid or polymethacrylic acid, for example those having a relative molecular weight of 800 to 150,000 (based on acid), are particularly preferred. Particularly suitable copolymeric polycarboxylates are those of acrylic acid with methacrylic acid and of acrylic acid or methacrylic acid with maleic acid. Copolymers of acrylic acid with maleic acid containing 50 to 90% by weight of acrylic acid and 50 to 10% by weight of maleic acid have proved to be particularly suitable. Their relative molecular weight, based on free acids, is generally in the range from 5,000 to 200,000, preferably in the range from 10,000 to 120,000 and more preferably in the range from 50,000 to 100,000. Biodegradable terpolymers are also particularly preferred, including for example those which contain salts of acrylic acid and of maleic acid and vinyl alcohol or vinyl alcohol derivatives as monomers (DE-A-43 00 772) or salts of acrylic acid and of 2-alkyl allyl sulfonic acid and sugar derivatives as monomers (DE-C-42 21 381). Other preferred copolymers are the copolymers which are described in German patent applications DE 43 03 320 and DE 44 17 734 and which preferably contain acrolein and acrylic acid/acrylic acid salts or acrolein and vinyl acetate as monomers.

In addition, the detergents/cleaners may also contain components with a positive effect on the removability of oils and fats from textiles by washing. This effect becomes particularly clear when a textile which has already been repeatedly washed with a detergent according to the invention containing this oil- and fat-dissolving component is soiled. Preferred oil- and fat-dissolving components include, for example, nonionic cellulose ethers, such as methyl cellulose and methyl hydroxypropyl cellulose containing 15 to 30% by weight of methoxyl groups and 1 to 15% by weight of hydroxypropoxyl groups, based on the nonionic cellulose ether, and the polymers of phthalic acid and/or terephthalic acid known from the prior art or derivatives thereof, more particularly polymers of ethylene terephthalates and/or polyethylene glycol terephthalates or anionically and/or nonionically modified derivatives thereof.

The detergents/cleaners may also contain components which further improve the solubility of heavy granules in particular. Corresponding components and their introduction are described, for example, in International patent application WO-A-93/02176 and in German patent application DE 42 03 031. Preferred components include in particular fatty alcohols containing 20 to 80 moles of ethylene oxide per mole of fatty alcohol, for example tallow fatty alcohol containing 30 EO and tallow fatty alcohol containing 40 EO, and fatty alcohols containing 14 EO and polyethylene glycols having a relative molecular weight of 200 to 2,000.

Among the compounds yielding $H_2O_2$ in water which serve as bleaching agents, sodium perborate tetrahydrate and sodium perborate monohydrate are particularly important. Other useful bleaching agents are, for example, sodium percarbonate, peroxypyrophosphates, citrate perhydrates and $H_2O_2$-yielding peracidic salts or peracids, such as perbenzoates, peroxophthalates, diperazelaic acid or diperdodecanedioic acid. The content of bleaching agents in the detergents/cleaners is preferably from 5 to 25% by weight and more preferably from 10 to 20% by weight, perborate monohydrate advantageously being used. Percarbonate is another preferred component although it is preferably not co-extruded but is optionally incorporated in a subsequent step.

In order to obtain an improved bleaching effect where washing is carried out at temperatures of 60° C. or lower, bleach activators may be incorporated in the preparations. Examples of bleach activators are N-acyl and O-acyl compounds which form organic peracids with $H_2O_2$, preferably N,N'-tetraacylated diamines, p-(alkanoyloxy)-benzenesulfonates, also carboxylic anhydrides and esters of polyols, such as glucose pentaacetate.

Other known bleach activators are the acetylated mixtures of sorbitol and mannitol described, for example, in European patent application EP-A-0 525 239. The bleach activator content of the bleach-containing detergents/cleaners is in the usual range and is preferably between 1 and 10% by weight and more preferably between 3 and 8% by weight. Particularly preferred bleach activators are N,N,N',N'-tetraacetyl ethylenediamine (TAED),1,5-diacetyl-2,4-dioxohexahydro-1,3,5-triazine (DADHT) and acetylated sorbitol/mannitol mixtures (SORMAN).

It can be of advantage to add typical foam inhibitors to the detergents/cleaners. Suitable foam inhibitors are, for example, soaps of natural or synthetic origin with a high percentage content of $C_{18-24}$ fatty acids. Suitable non-surface-active foam inhibitors are, for example, organopolysiloxanes and mixtures thereof with microfine, optionally silanized silica and also paraffins, waxes, microcrystalline waxes and mixtures thereof with silanized silica or bis-stearyl ethylenediamide. Mixtures of various foam inhibitors, for example mixtures of silicones, paraffins or waxes, are also used with advantage. The foam inhibitors, more particularly silicone- and/or paraffin-containing foam inhibitors, are preferably fixed to a granular water-soluble or water-dispersible support. Mixtures of paraffins and bis-stearyl ethylenediamides are particularly preferred.

Suitable enzymes are those from the class of proteases;, lipases, amylases, cellulases and mixtures thereof. Enzymes obtained from bacterial strains or fungi, such as *Bacillus subtilis, Bacillus licheniformis, Streptomyces griseus* and *Humicola insolens,* are particularly suitable. Proteases of the subtilisin type are preferably used, proteases obtained from *Bacillus lentus* being particularly suitable. Enzyme mixtures, for example mixtures of protease and amylase or protease and lipase or protease and cellulase or mixtures of cellulase and lipase or mixtures of protease, amylase and lipase or protease, lipase and cellulase, but especially protease- and/or lipase-containing mixtures are of particular interest. (Per)oxidases have also proved to be suitable in some cases. The enzymes may be adsorbed to supports and/or encapsulated in shell-forming substances to protect them against premature decomposition. The percentage content of enzymes, enzyme mixtures or enzyme granules may be, for example, of the order of 0.1 to 5% by weight and preferably from 0.1 to around 2% by weight.

Suitable stabilizers are the salts of polyphosphonic acids, more particularly 1-hydroxyethane-1,1-diphosphonic acid (HEDP), diethylene-triamine pentamethylenephosphonic acid (DETPMP) or ethylenediamine tetramethylenephosphonic acid.

The detergents/cleaners may also contain other enzyme stabilizers. For example, 0.5 to 1% by weight of sodium formate may be used. It is also possible to use proteases which are stabilized with soluble calcium salts and which have a calcium content of preferably about 1.2% by weight, based on the enzyme. However, it is of particular advantage to use boron compounds, for example boric acid, boron oxide, borax and other alkali metal borates, such as the salts of orthoboric acid ($H_3BO_3$), metaboric acid ($HBO_2$) and pyroboric acid (tetraboric acid $H_2B_4O_7$).

The function of redeposition inhibitors is to keep the soil detached from the fibers suspended in the wash liquor and thus to prevent discoloration. Suitable redeposition inhibitors are water-soluble, generally organic colloids, for example the water-soluble salts of polymeric carboxylic acids, glue, gelatine, salts of ether carboxylic acids or ether sulfonic acids of starch or cellulose or salts of acidic sulfuric acid esters of cellulose or starch. Water-soluble polyamides containing acidic groups are also suitable for this purpose. Soluble starch preparations and other starch products than those mentioned above, for example degraded starch, aldehyde starches, etc., may also be used. Polyvinyl pyrrolidone is also suitable. However, cellulose ethers, such as carboxymethyl cellulose (Na salt), methyl cellulose, hydroxyalkyl cellulose, and mixed ethers, such as methyl hydroxyethyl cellulose, methyl hydroxypropyl cellulose, methyl carboxymethyl cellulose and mixtures thereof, and polyvinyl pyrrolidone are preferably used, for example in quantities of 0.1 to 5% by weight, based on the detergent/cleaner.

The detergents/cleaners may contain derivatives of diaminostilbene disulfonic acid or alkali metal salts thereof as optical brighteners. Suitable optical brighteners are, for example, salts, of 4,4'-bis-(2-anilino-4-morpholino-1,3,5-triazinyl-6-amino)-stilbene-2,2'-disulfonic acid or compounds of similar composition which contain a diethanolamino group, a methylamino group, an anilino group or a 2-methoxyethylamino group instead of the morpholino group. Brighteners of the substituted diphenyl styryl type, for example alkali metal salts of 4,4'-bis(2-sulfostyryl)-diphenyl, 4,4'-bis-(4-chloro-3-sulfostyryl)-diphenyl or 4-(4chlorostyryl)-4'-(2-sulfostyryl)-diphenyl, may also be present. Mixtures of the brighteners mentioned above may also be used.

EXAMPLES

Example 1

70 Parts by weight of spray-dried granules of 80% by weight of a sodium silicate with a modulus of 2.4, 5% by weight of sodium carbonate and 15% by weight of water were mixed in a 3 liter Lödige mixer (Lödige FM) with 30 parts by weight of an aqueous dispersion of 50% by weight of $C_{12-18}$ alcohol containing 7 EO, 25% by weight of water and 25% by weight of spray- dried silicate granules with the composition indicated above. Mixing was followed by stirring for 1 minute. The bulk density was 550 g/l. The free-flowing behavior was rated at 67% (test method see below).

For comparison, 70 parts by weight of the granular silicate mentioned above were mixed with 15 parts by weight of a pure $C_{12-18}$ alcohol containing 7 EO. The product was then to have been mixed with 15 parts by weight of the 50% by weight aqueous solution of the spray-dried silicate granules. However, the silicate granules initially introduced did not flow after mixing with the nonionic surfactant on its own (flowability could not be measured!) and were so tacky and paste-like that further mixing with the aqueous solution was impossible.

Example 2

Example 1 was repeated with 83 parts by weight of spray-dried silicate granules having the composition indicated in Example 1 and 10 parts by weight of an aqueous dispersion of 72% by weight of $C_{12-18}$ alcohol containing 7 EO, 24% by weight of water and 4% by weight of sodium sulfate. The granules were then aftertreated with 7 parts by weight of a 30% by weight aqueous solution of Sokalan CP5® (copolymeric sodium salt of acrylic acid and maleic acid, a commercial product of BASF, Federal Republic of Germany). The bulk density amounted to 468 g/l. Flow behavior was rated at 79%.

For comparison, 83 parts by weight of the spray-dried silicate granules mentioned were mixed with 10 parts by weight of $C_{12-18}$ alcohol containing 7 EO. However, the silicate granules did not flow after mixing the nonionic surfactant alone (flowability could not be measured!) and were so tacky and paste-like that further treatment with the aqueous Sokalan solution was not possible.

Even a reduction in the quantity of nonionic surfactant with which the silicate granules were mixed to 7.2 parts by weight failed to produce a free-flowing product which, again, could not be further treated with an aqueous solution Example 3

Replacement of the $C_{12-18}$ alcohol·7 EO by $C_{12-18}$ fatty acid methyl ester·12 EO in Examples 1 and 2 produced comparable results in regard to flow behavior.

Method for determining free-flowing behavior

To determine free-flowing behavior, quantities of 1 liter of the silicate products produced in accordance with Examples 1 to 3 according to the invention were introduced into a powder hopper of which the outflow opening was initially closed, after which the flow-out time of the silicate-containing products was measured by comparison with dry sea sand. The flow-out time of the dry sea sand after the outflow opening had been uncovered (13 seconds) was put at 100%.

What is claimed is:

1. A process of producing a particulate amorphous alkali metal silicate having a molar ratio of $M_2O$ to $SiO_2$ of 1:1.5 to 1:3.3, M being an alkali metal, comprising;

a) spray-drying an aqueous mixture of said amorphous alkali metal silicate, b) impregnating the spray-dried amorphous alkali metal silicate with an aqueous dispersion or solution of detergent components containing at least one organic component, and c) optionally drying the impregnated amorphous alkali metal silicate.

2. A process as in claim 1 wherein said aqueous mixture of amorphous alkali metal silicate is free of alkali metal carbonate.

3. A process as in claim 1 wherein said aqueous mixture of amorphous alkali metal silicate contains alkali metal carbonate in a ratio by weight of alkali metal silicate to alkali metal carbonate of 3:1 to 20:1.

4. A process as in claim 1 wherein said particulate amorphous alkali metal silicate contains 55% to 95% by weight of alkali metal silicate, 0 to 15% by weight of alkali metal carbonate, and 5% to 22% by weight of water, based on the weight of said particulate amorphous alkali metal silicate.

5. A process as in claim 1 wherein said aqueous mixture of amorphous alkali metal silicate contains from 0.5% to 20% by weight of detergent components, based on the weight of said particulate amorphous alkali metal silicate.

6. A process as in claim 1 wherein said aqueous mixture of amorphous alkali metal silicate contains 1% to 15% by weight of anionic surfactants or organic builder components, based on the weight of said particulate amorphous alkali metal silicate.

7. A process as in claim 1 wherein said spray-dried amorphous alkali metal silicate is impregnated with 3% to 40% by weight of an aqueous dispersion of detergent components, based on the weight of said amorphous alkali metal silicate.

8. A process as in claim 1 wherein said aqueous dispersion or solution of detergent components contains a nonionic surfactant and optionally at least one inorganic salt.

9. A process as in claim 8 wherein said inorganic salt is selected from the group consisting of silicates, carbonates, bicarbonates and sulfates.

10. A process as in claim 1 wherein said aqueous dispersion or solution of detergent components contains 10% to 40% by weight of a spray-dried amorphous alkali metal silicate, based on the weight of said aqueous dispersion or solution.

11. A process as in claim 1 wherein said organic component comprises an ethoxylated or ethoxylated and propoxylated fatty acid alkyl ester.

12. A process as in claim 1 wherein the aqueous dispersion or solution has no inorganic component other than water.

13. A process as in claim 1 wherein said spray-dried amorphous alkali metal silicate and at least one other solid, powdered or granular material selected from the group consisting of alkali metal carbonate and organic builders are impregnated together with said aqueous dispersion or solution of detergent components.

14. A process as in claim 1 wherein 60 to 85 parts by weight of a spray-dried amorphous alkali metal silicate are first impregnated with 5 to 38 parts by weight of said aqueous dispersion or solution of detergent components, and then post-treated with 2 to 15 parts by weight of another liquid composition.

15. A process as in claim 14 including drying the impregnated amorphous alkali metal silicate if the water content thereof is more than 22% by weight.

16. A process as in claim 1 including drying the impregnated amorphous alkali metal silicate if the water content thereof is more than 22% by weight.

17. A process as in claim 1 including post-treating the impregnated amorphous alkali metal silicate with a dry, particulate material.

18. A process as in claim 1 including adding the impregnated amorphous alkali metal silicate to a detergent composition.

* * * * *